United States Patent
Kakinami et al.

(10) Patent No.: US 7,216,731 B2
(45) Date of Patent: May 15, 2007

(54) MOTOR-DRIVEN WHEEL SMALL IN SIZE AND IMPROVED IN RIDE COMFORT, EASE OF ASSEMBLY AND RELIABILITY

(75) Inventors: Takuma Kakinami, Toyota (JP); Takeo Yamamoto, Nissin (JP); Shigekazu Yogo, Nagoya (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 125 days.

(21) Appl. No.: 11/126,228

(22) Filed: May 11, 2005

(65) Prior Publication Data
US 2005/0257970 A1    Nov. 24, 2005

(30) Foreign Application Priority Data
May 18, 2004    (JP)    ............................. 2004-147910

(51) Int. Cl.
*B60K 1/00* (2006.01)
(52) U.S. Cl. .................... 180/65.5; 180/65.1; 180/65.2
(58) Field of Classification Search ............... 180/65.5, 180/65.1, 65.2
See application file for complete search history.

(56) References Cited

U.S. PATENT DOCUMENTS

| | | | | |
|---|---|---|---|---|
| 2,298,585 A | * | 10/1942 | Phelps | .................. 267/254 |
| 5,322,141 A | * | 6/1994 | Brunner et al. | ............. 180/65.5 |
| 6,193,419 B1 | * | 2/2001 | Krude et al. | ................. 384/544 |
| 6,199,652 B1 | * | 3/2001 | Mastroianni et al. | ....... 180/229 |
| 6,550,975 B2 | * | 4/2003 | Inoue et al. | ................. 384/537 |
| 6,579,384 B2 | * | 6/2003 | Usui et al. | ................... 148/318 |
| 7,118,119 B2 | * | 10/2006 | Amanuma | ........... 280/124.135 |
| 2003/0168265 A1 | * | 9/2003 | Goertzen et al. | .......... 180/65.1 |

FOREIGN PATENT DOCUMENTS

WO    WO 02/083446 A1    10/2002

OTHER PUBLICATIONS

Go Nagaya et al.; "Development of an In-Wheel Motor with Advanced Dynamic-Damper Mechanism"; Proceedings of 2002 JSAE Autumn Convention, No. 83-02, The Society of Automotive Engineers of Japan, 2002 pp. 9-12 w/ partial transl.

* cited by examiner

*Primary Examiner*—Christopher P. Ellis
*Assistant Examiner*—John R. Olszewski
(74) *Attorney, Agent, or Firm*—Oliff & Berridge, PLC (57) ABSTRACT

A motor-driven wheel includes a wheel disc, a wheel hub, a decelerator, a knuckle, a hub bearing, a constant-velocity joint, an in-wheel motor, and a spring. Since the decelerator is placed closer to the outside of the vehicle relative to the hub bearing, the space where the in-wheel motor is to be mounted can readily be secured. Further, balls are arranged along a spherical external surface of an outer race and the outer race is supported swingably in the axial direction. Thus, even when a great axial force is exerted, the axial force can be endured. The outer race can be supported swingably and rotatably with respect to the wheel hub.

10 Claims, 10 Drawing Sheets

MOTOR-DRIVEN WHEEL SMALL IN SIZE AND IMPROVED IN RIDE COMFORT, EASE OF ASSEMBLY AND RELIABILITY

This nonprovisional application is based on Japanese Patent Application No. 2004-147910 filed with the Japan Patent Office on May 18, 2004, the entire contents of which are hereby incorporated by reference.

BACKGROUND OF THE INVENTION

1. Field of the Invention

The present invention relates to a motor-driven wheel improving ride comfort of vehicles.

2. Description of the Background Art

An in-wheel motor drive unit that uses a motor as the mass of a damper and that supports the motor by a motor suspension is known (Document 1: International Patent Publication No. WO02/083446A1, Document 2: Go Nagaya et al., "Development of an In-Wheel Motor with Advanced Dynamic-Damper Mechanism (20025544)", Proceedings of 2002 JSAE Autumn Convention, No. 83-02, The Society of Automotive Engineers of Japan, Nov. 26, 2002, pp. 9–12). The motor is coupled to a wheel of a wheel and tire unit (hereinafter referred to as wheel unit) to rotate the wheel unit. The motor suspension supports the motor to allow the motor to vibrate in the up-and-down direction of the vehicle's body and separates the motor from unsprung weights. The wheel is supported on the vehicle's body by a suspension arm. Regarding this in-wheel motor drive system, as the wheel unit vibrates, the vibrations are transmitted through the wheel to the motor to cause the motor to vibrate in the up-and-down direction of the vehicle's body. The vibrations of the motor cancel vibrations of unsprung components. Here, a flexible coupling is used for smoothly transmitting power generated by the motor to the wheel unit even if respective rotational axes of the motor and the wheel unit become eccentric from each other.

For reduction in size of the motor, it is desirable to transmit the motor torque through a decelerator to the wheel. However, if the motor is mounted to serve as the dynamic damper as mentioned above, it is necessary to avoid interference between the motor and peripheral components since the motor vibrates, resulting in a problem of possible difficulty in mounting the motor depending on the position of the decelerator.

Further, when the vehicle corners, a considerably great axial force is exerted on the motor. Such an enormous axial force has to be supported. Thus, there still is a need of improvements in position of the decelerator and support of the motor.

SUMMARY OF THE INVENTION

An object of the present invention is to provide a motor-driven wheel that is small in size and improved in reliability while improving ride comfort of vehicles.

In summary, the present invention is a motor-driven wheel including: a motor supported swingably in up-and-down direction of a body of a vehicle and rotating a wheel unit; a wheel hub rotated together with the wheel unit; a hub bearing rotatably supporting the wheel hub; a decelerator placed closer to outside of the vehicle relative to the hub bearing and using a planetary gear mechanism to transmit torque of the motor to the wheel hub; and a constant-velocity joint transmitting motive power between an output shaft of the motor and the decelerator. The constant-velocity joint includes: an outer race having an opening facing the outside of the vehicle, supported swingably and rotatably with respect to the wheel hub and connected to the output shaft of the motor; an inner race connected to an input shaft of the decelerator; and a first rolling body transmitting motive power between the inner race and the outer race.

Preferably, the motor-driven wheel further includes a knuckle connected to a suspension arm attached to the body of the vehicle, and the motor is connected to the knuckle through an elastic member.

More preferably, the hub bearing is fixed to the knuckle.

Preferably, the outer race has its external surface including a spherical portion having its center at a center of swing of the constant-velocity joint, the constant-velocity joint further includes a second rolling body placed inward of the vehicle relative to the center of swing of the constant-velocity joint, along the spherical portion of the external surface of the outer race, and the wheel hub has a contact surface extending in a direction of swing of the outer race and contacting the second rolling body.

More preferably, the motor-driven wheel further includes a seal member placed inward of the vehicle relative to the second rolling body and placed between the outer race and the wheel hub to hermetically enclose oil.

Preferably, the decelerator includes a sun gear connected to the inner race, a ring gear fixed non-rotatably, a plurality of pinion gears arranged to mesh with both of the sun gear and the ring gear, a planetary carrier fixed to the wheel hub and rotatably supporting the pinion gears, and a bearing placed at an end of the sun gear and supporting a load in thrust direction.

Preferably, the constant-velocity joint is of bar field type, the constant-velocity joint further includes a cage restraining position of the first rolling body, and the outer race has an internal surface that contacts the cage and that is undercut-free in shape.

Preferably, the output shaft of the motor is fit in the outer race, the output shaft of the motor has a leading end passing through the outer race, and the motor-driven wheel further includes a fixing member attached from the opening of the outer race to the leading end for fixing the output shaft to prevent the output shaft from coming off the outer race.

Preferably, the output shaft of the motor includes a fit portion having its surface grooved for spline-fitted with the outer race, and a non-fit portion provided closer to the motor relative to the fit portion, and the motor-driven wheel further includes a seal member placed between the non-fit portion and the outer race.

According to the present invention, the decelerator is placed closer to the outside of the vehicle, relative to the position of the hub bearing. Therefore, the space where the motor is to be mounted can readily be secured. The constant-velocity joint supports the motor swingably in the axial direction. Therefore, even if an enormous axial force is exerted on the motor, the motor-driven wheel can endure the axial force. Further, in the state where the outer race of the constant-velocity joint is supported swingably and rotatably with respect to the hub, the lubricant for the constant-velocity joint and the decelerator can appropriately be enclosed hermetically.

Furthermore, while the bearing suppresses an axial movement of the inner race of the constant-velocity joint, the wheel can smoothly be rotated. The constant-velocity joint can be reduced in size and improved in ease of installation. Moreover, the motor output shaft can be prevented from coming off the outer race to protect the spline-fit portion of the motor output shaft against, for example, entry of foreign matters and rust.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described in detail with reference to the drawings. In the drawings, like components are denoted by like reference characters and a description thereof is not repeated.

Entire Structure of Motor-Driven Wheel

Figure 1:
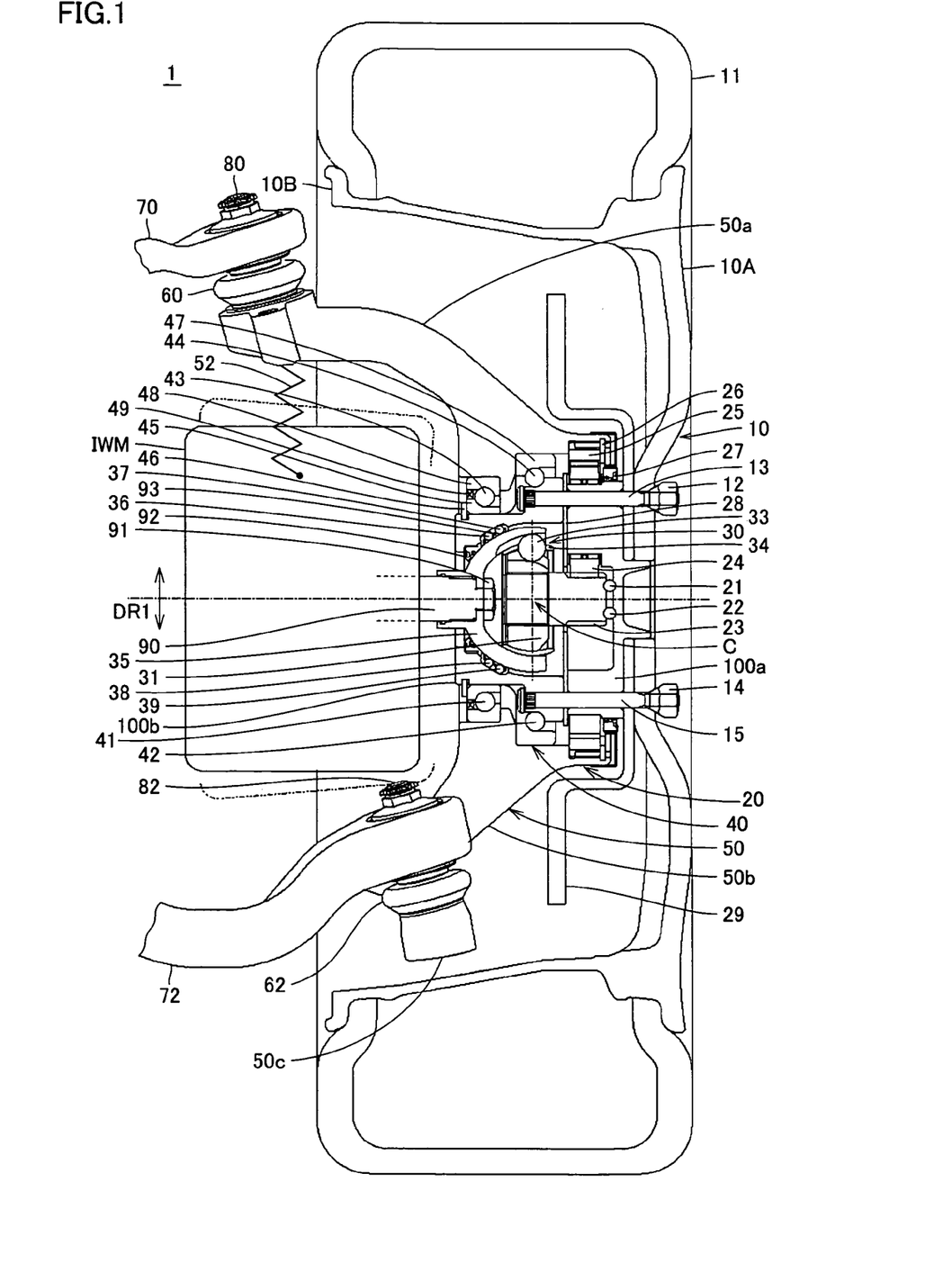
FIG. 1 shows an entire structure of a motor-driven wheel according to an embodiment of the present invention.

FIG. 1 shows an entire structure of a motor-driven wheel according to the embodiment of the present invention.

Referring to FIG. 1, motor-driven wheel 1 includes a wheel disc 10, a wheel hub 100b, a decelerator 20, a knuckle 50, a hub bearing 40, a constant-velocity joint 30, an in-wheel motor IWM, and a spring 52. Wheel hub 100b is connected to a planetary carrier 100a in decelerator 20 with bolts 13, 15 and nuts 12, 14 to form a so-called wheel hub. Here, for convenience of description, wheel hub 100b is called wheel hub.

Motor-driven wheel 1 is supported by a suspension arm that is a wheel support unit. The suspension arm includes an upper arm 70 and a lower arm 72. Upper arm 70 and an upper knuckle 50a are connected by a kingpin 80 and a ball joint 60. Lower arm 72 and a lower knuckle 50c are connected by a kingpin 82 and a ball joint 62. Lower knuckles 50b and 50c are connected behind lower arm 72 as seen in FIG. 1.

The structure of the components each is now described.

Wheel disc 10 is substantially in the shape of a cup and includes a disc portion 10A and a rim portion 10B. Wheel disc 10 houses therein decelerator 20, a disc rotor 29, hub bearing 40, constant-velocity joint 30 and in-wheel motor IWM. A tire 11 is secured to the outer edge of rim portion 10B of wheel disc 10.

Bolts 13, 15 and nuts 12, 14 couple disc portion 10A of wheel disc 10, wheel hub 100b, planetary carrier 100a, and disc rotor 29.

Wheel hub 100b is supported rotatably in the normal and reverse directions by hub bearing 40. In-wheel motor IWM has its casing connected to knuckle 50 through spring 52 which is an "elastic member." Accordingly, in-wheel motor IWM is supported so that it does not rotate with respect to knuckle 50 while being supported so that it can vibrate in the up-and-down direction DR1 of the vehicle's body.

A motor output shaft 90 of in-wheel motor IWM is connected to constant-velocity joint 30. Constant-velocity joint 30 permits angular displacement between the rotational axis of motor output shaft 90 and the rotational axis of wheel hub 100b and planetary carrier 100a.

Torque of in-wheel motor IWM is transmitted to constant-velocity joint 30 and increased by decelerator 20 to be transmitted to wheel disc 10.

Figure 2:
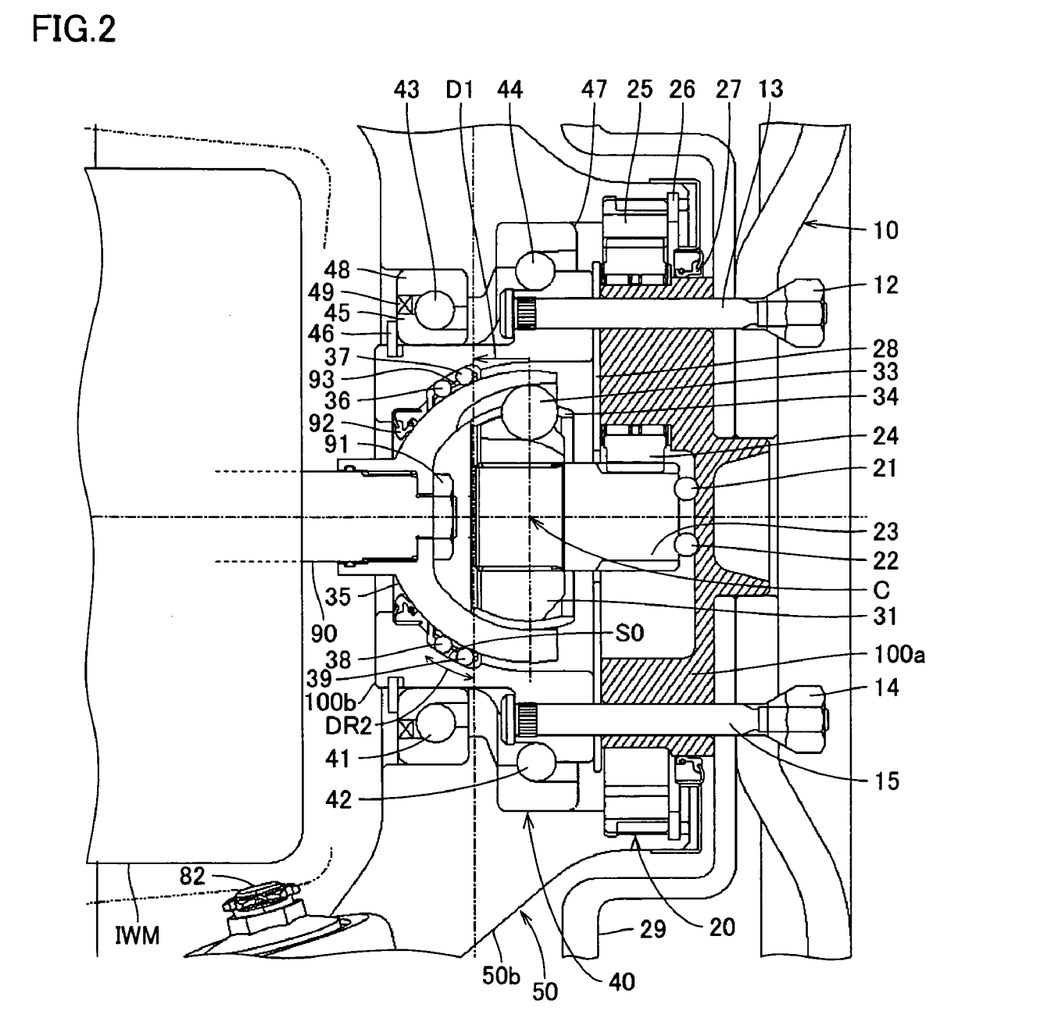
FIG. 2 is an enlarged view of a constant-velocity joint 30, a hub bearing 40, a decelerator 20 and their nationhood in FIG. 1.

FIG. 2 is an enlarged view of constant-velocity joint 30, hub bearing 40, decelerator 20 and their neighborhood in FIG. 1.

Referring to FIG. 2, hub bearing 40 includes balls 41–44, a ball holding ring 47 that holds balls 42, 44, ball holding rings 45, 48 that hold balls 41, 43, a snap ring 46 for holding ball holding ring 45 to prevent ring 45 from coming off wheel hub 100b, and an oil seal 49 provided in a gap between holding ring 45 and holding ring 48.

Constant-velocity joint 30 includes an outer race 35 spline-fitted with motor output shaft 90, a nut 91 preventing outer race 35 from coming off motor output shaft 90, a ball 33, a cage 34 restraining the position of ball 33, and an inner race 31 which is located inside cage 34 and to which a rotational force of outer race 35 is transmitted through ball 33. A sun gear 23 of decelerator 20 is spline-fitted with inner race 31.

Outer race 35 has an opening facing the outside of the vehicle, and is supported swingably and rotatably with respect to wheel hub 100b. Ball 33 is a "rolling body" transmitting motive power between inner race 31 and outer race 35.

The external surface of outer race 35 includes a spherical portion having its center at the center of swing C of constant-velocity joint 30. Center-of-swing C is also called joint center of the constant-velocity joint. Constant-velocity joint 30 further includes balls 36–39 that are "rolling bodies" placed inward of the vehicle at a distance D1 from center-of-swing C of constant-velocity joint 30 along the spherical portion of the external surface of outer race 35, and includes a cage 93 restraining the positions of balls 36–39.

Wheel hub 100b has a contact surface S0 formed to extend in the direction of swing of outer race 35 and contact balls 36–39. Contact surface S0 has a certain width in the direction of swing DR2 to allow balls 36–39 which are "rolling bodies" to roll. Although balls 36–39 are arranged here in two rows, they may be arranged in a single row or more than two rows.

As the motor is driven, a rotational difference is always generated between outer race 35 of the constant-velocity joint and wheel hub 100b. Balls 36–39, contact surface S0 of wheel hub 100b and the spherical portion of the external surface of outer race 35 allow outer race 35 of the constant-velocity joint to be supported swingably and rotatably with respect to wheel hub 100b.

Motor-driven wheel 1 further includes a seal member 92 placed inward of the vehicle relative to balls 36–39 and placed between outer race 35 and wheel hub 100b for hermetically enclosing oil.

Decelerator 20 decreases rotations transmitted from the constant-velocity joint by means of a planetary gear mechanism and increases the torque to drive wheel disc 10.

Decelerator 20 includes sun gear 23 spline-fitted with inner race 31, a ring gear 25 secured so that ring gear 25 cannot rotate with respect to knuckle 50, a pinion gear 24 placed to mesh with both of sun gear 23 and ring gear 25, planetary carrier 100a secured to wheel hub 100b with bolts 13, 15 and nuts 12, 14 and rotatably supporting pinion gear 24, and thrust bearings 21, 22 placed between an end of sun gear 23 and planetary carrier 100a. In FIG. 2, planetary carrier 100a is hatched so that the shape thereof is clearly seen.

In addition to pinion gear 24, two pinion gears are provided (not shown). Decelerator 20 further includes a needle bearing rotatably supporting each pinion gear with respect to planetary carrier 100a, a gear drop prevention plate 28 preventing pinion gear 24 from dropping from planetary carrier 100a, and a snap ring 26 holding ring gear 25 to prevent ring gear 25 spline-fitted with knuckle 50 from coming off.

Figure 3:
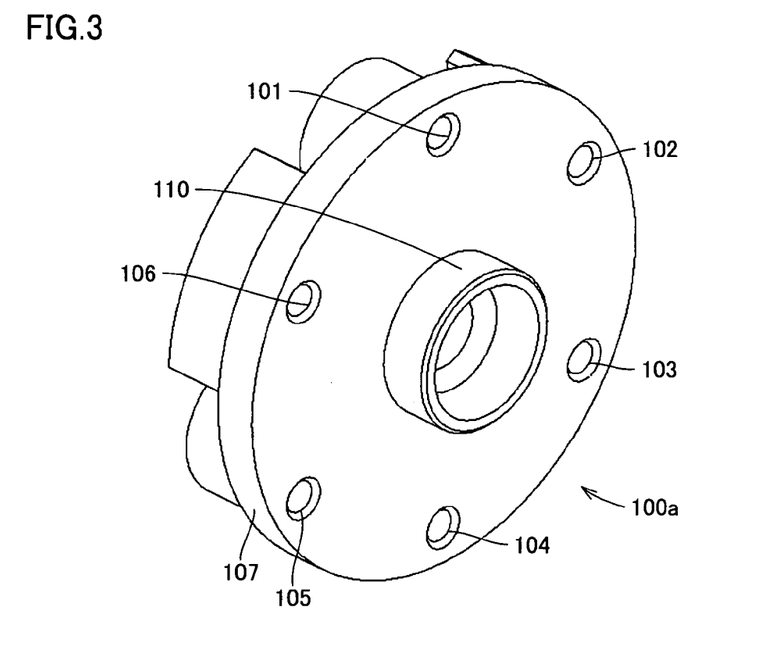
FIG. 3 is a perspective view for illustrating the shape of a planetary carrier 100a of decelerator 20 as seen from the outside of the vehicle.

FIG. 3 is a perspective view for illustrating the shape of planetary carrier 100a of decelerator 20 as seen from the outside of the vehicle.

Referring to FIG. 3, at a central portion of a circular plate 107, a cylindrical projection 110 is provided for alignment with a hole at a central portion of wheel disc 10. Around projection 110, holes 101–106 are provided for allowing bolts 13, 15 for example to pass therethrough.

Figure 4:
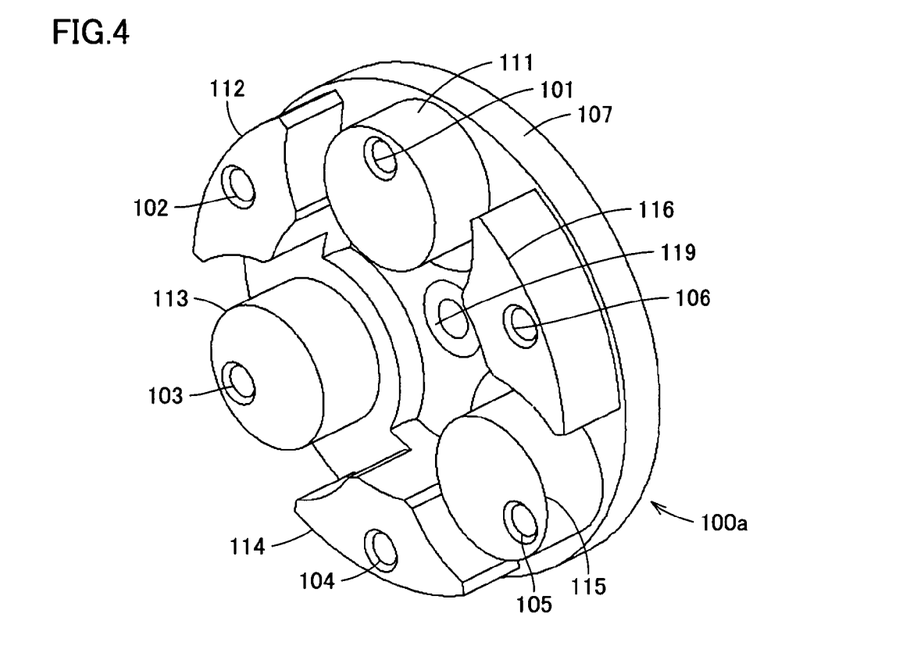
FIG. 4 is a perspective view for illustrating the shape of planetary carrier 100a of decelerator 20 as seen from the inside of the vehicle.

FIG. 4 is a perspective view for illustrating the shape of planetary carrier 100a of decelerator 20 as seen from the inside of the vehicle.

Referring to FIG. 4, projections 111–116 are provided that protrude, from circular plate 107, inward of the vehicle. Projections 111–116 have respective holes 101–106 for allowing bolts to pass therethrough.

Around projections 111, 113 and 115, needle bearings are placed. Around the needle bearings, corresponding three pinion gears are further placed. In FIG. 2, cross sections of projections 111 and 114 are shown. Pinion gear 24 is provided around projection 111.

At a central portion of projections 111–116, a guide groove 119 is provided for allowing thrust bearings 21, 22 to roll. A groove similar to guide groove 119 is provided at the end of sun gear 23 in FIG. 2.

Description of External Surface of Outer Race of Constant-Velocity Joint

Figure 5:
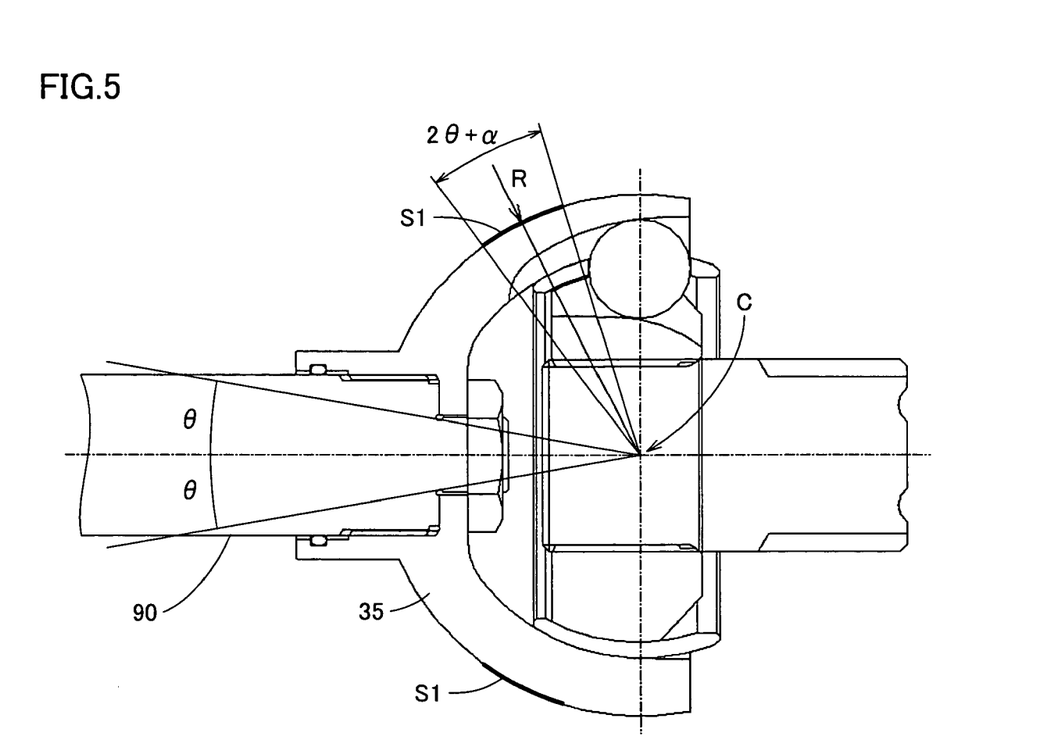
FIG. 5 illustrates an external surface of an outer race 35 of a constant-velocity joint 30.

FIG. 5 illustrates the external surface of outer race 35 of constant-velocity joint 30.

Referring to FIG. 5, the external surface of outer race 35 includes a spherical portion S1 having its center at center-of-swing C of constant-velocity joint 30. The distance between spherical portion S1 and center-of-swing C is R and constant.

Supposing that the angle of swing of in-wheel motor IWM is ±θ, at least spherical portion S1 has to be larger than 2θ. Although the balls may be arranged in a single row, bolls 36–39 are arranged in two rows in FIG. 2. Therefore, an extra width α corresponding to the width of the two rows is necessary. Thus, in the example shown in FIG. 2, at least spherical portion S1 is 2θ+α or more in size.

Seal member 92 is placed in FIG. 2 for preventing leakage of grease enclosed in the constant-velocity joint. Therefore, preferably the spherical portion of outer rate 35 extends over a portion of contact with sealing member 92 to allow sealing member 92 to appropriately contact outer race 35 even when the motor swings. The external surface may entirely be spherical in shape except for the portion where motor output shaft 90 is attached.

Figure 6:
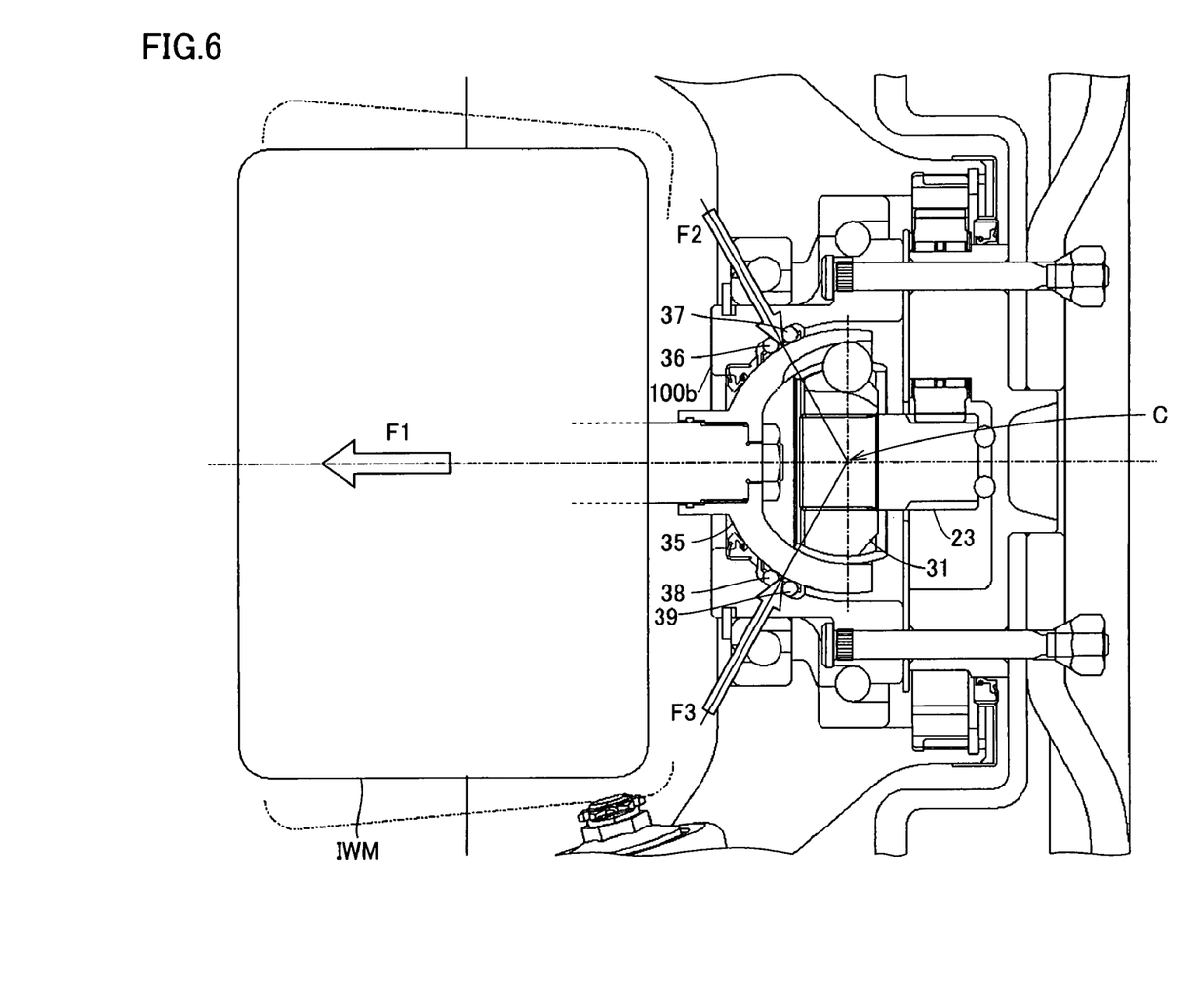
FIG. 6 illustrates balance between forces applied to outer race 35 when the vehicle corners.

FIG. 6 illustrates balance between forces applied to outer race 35 when the vehicle corners.

When the vehicle corners, it is necessary to support great axial centrifugal force and inertial force applied to motor components. While in-wheel motor IWM is swingably supported by spring 52, spring 52 cannot satisfactorily support a force F1 exerted in the direction of the output shaft of the motor. Therefore, such axial forces as centrifugal force and inertial force applied to the motor components when the vehicle corners are efficiently supported by constant-velocity joint 30.

As shown in FIG. 6, regarding motor-driven wheel 1 of the present invention, the opening of outer race 35 faces outward of the vehicle, namely oppositely to in-wheel motor IWM with constant-velocity joint 30 therebetween. Balls 36–39 are placed along the spherical portion of the external surface of outer race 35. The balls are supported by wheel hub 100b.

Thus, force F1 applied in the direction of the output shaft of the motor can be balanced with a force F2 and a force F3 shown in FIG. 6. With this structure, no force that could cause the motor output shaft to come off the outer race is applied to the inside of constant-velocity joint 30. Therefore, inner race 31 may be spline-fitted with sun gear 23 without being fixed with a snap ring or the like.

Description of Internal Surface of Outer Race of Constant-Velocity Joint

Figure 7:
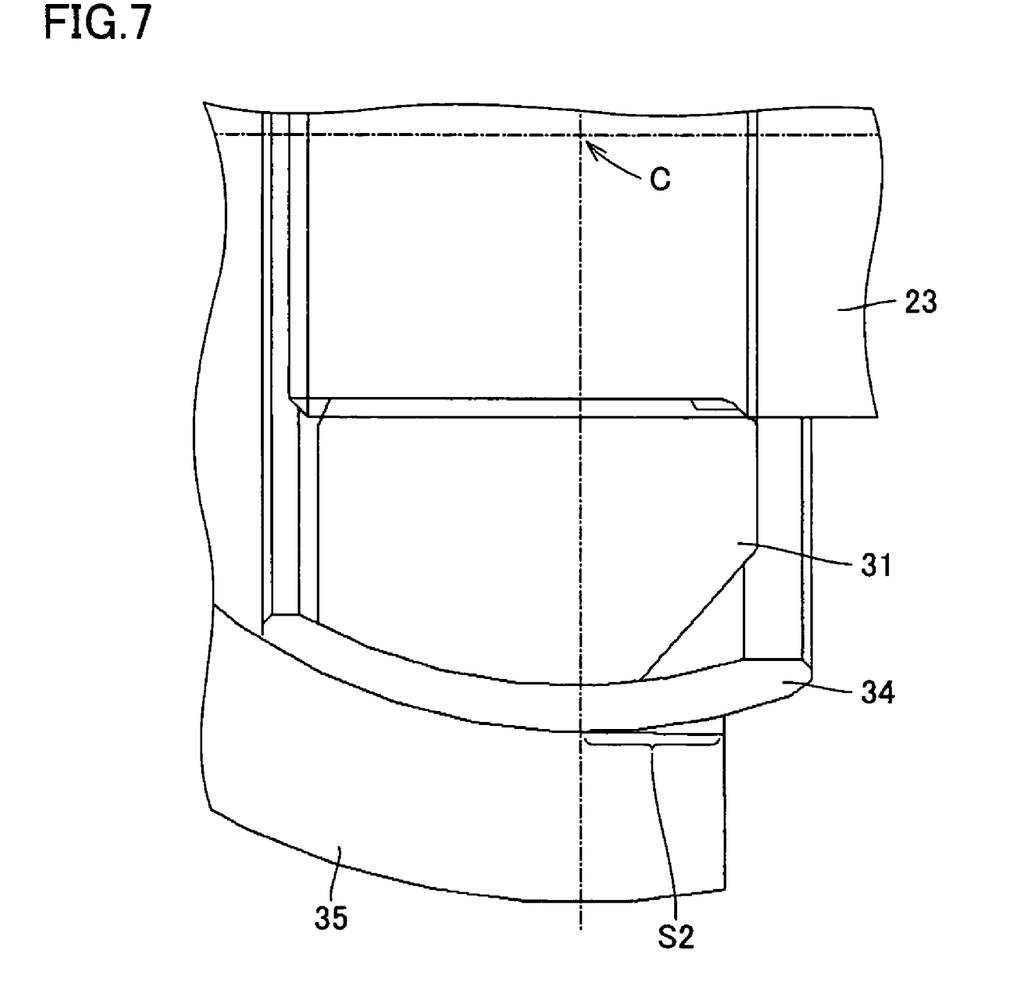
FIG. 7 is an enlarged view for illustrating the shape of an internal surface of outer race 35.

Outer race 35 of constant-velocity joint 30 has an internal surface that contacts cage 34 and is undercut-free in shape to facilitate assembly of the constant-velocity joint.

FIG. 7 is an enlarged view for illustrating the shape of the internal surface of outer race 35.

Referring to FIG. 7, outer race 35 has the internal surface that contacts cage 34 and that is undercut-free in shape. The undercut-free shape refers to the shape of a portion S2 of the internal surface, portion S2 is located outward of the vehicle with respect to a cross section perpendicular to the axis passing through center-of-swing C, and portion S2 is not narrowed toward the axis like that of the commonly-used constant-velocity joint. In other words, supposing that the internal surface of the outer race is cut along cross sections, at different positions respectively, perpendicular to the rotational axis, from the side closer to the motor position, the cross sections monotonously increase from the side closer to the motor position toward the outside of the vehicle.

Regarding a usual bar-field-type constant-velocity joint, the outer race and the inner race should axially be supported. In other words, in order to prevent the cage and the inner race from coming off the outer race, it is indispensable that the outer race has an internal surface that contacts the cage and that has an undercut shape.

When the internal surface has the undercut shape, it is necessary to incline the cage by a predetermined installation angle to be inserted into the outer race and thereafter further incline the inner race for installing the ball. Further, if the installation angle is larger, a cage window receiving the ball has to be made longer. In this case, the frame of the cage is made thinner, resulting in a decrease in strength of the constant-velocity joint.

Furthermore, it is necessary to make the groove of the outer race longer than the size corresponding to an actually used swing angle in order to install the ball therein.

Figure 8:
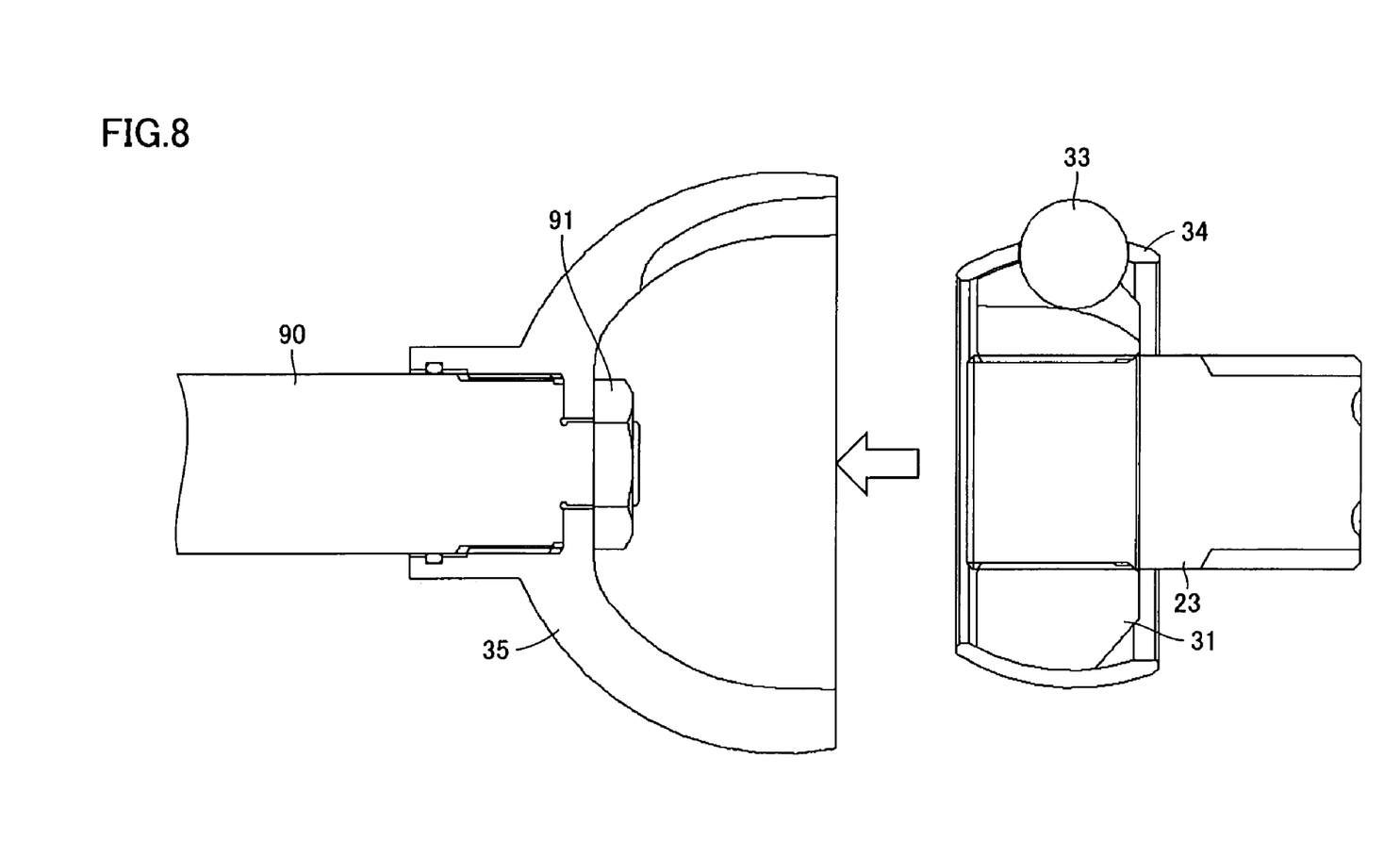
FIG. 8 illustrates assembly of the constant-velocity joint used for the motor-driven wheel of the present invention.

FIG. 8 illustrates assembly of the constant-velocity joint used for the motor-driven wheel of the present invention.

Referring to FIG. 8, firstly inner race 31 is placed within cage 34. At this time, a cage window of cage 34 is set at the position of a guide groove of inner race 31. Next, ball 33 is installed from the outside of cage 34. Further, sun gear 23 and inner race 31 are spline-fitted. Sun gear 23 and inner race 31 may be fitted before inner race 31 is placed within cage 34.

Regarding the outer race, motor output shaft 90 is inserted into and spline-fitted with outer race 35. Nut 91 is then installed on a screwed end of motor output shaft 90 that passes through outer race 35, so that motor output shaft 90 does not come off outer race 35.

Then, as indicated by the arrow in FIG. 8, the assembled inner race unit may be inserted directly into outer race 35. Since the internal surface of outer race 35 has no undercut, the inner race unit can be installed straight without being inclined.

In the case where in-wheel motor IWM is used as the damper mass, the swing angle θ of approximately 10° to 20° is enough. Since outer race 35 does not have an extra length of the guide groove for installing the ball therein, the guide groove of outer race 35 may have the size corresponding to the swing angle. Thus, as compared with the usual bar-field-type constant-velocity joint, the size of the joint can be reduced.

Here, sun gear 23 may be fitted in inner race 31 after inner race 31 is inserted into outer race 35.

Figure 9:
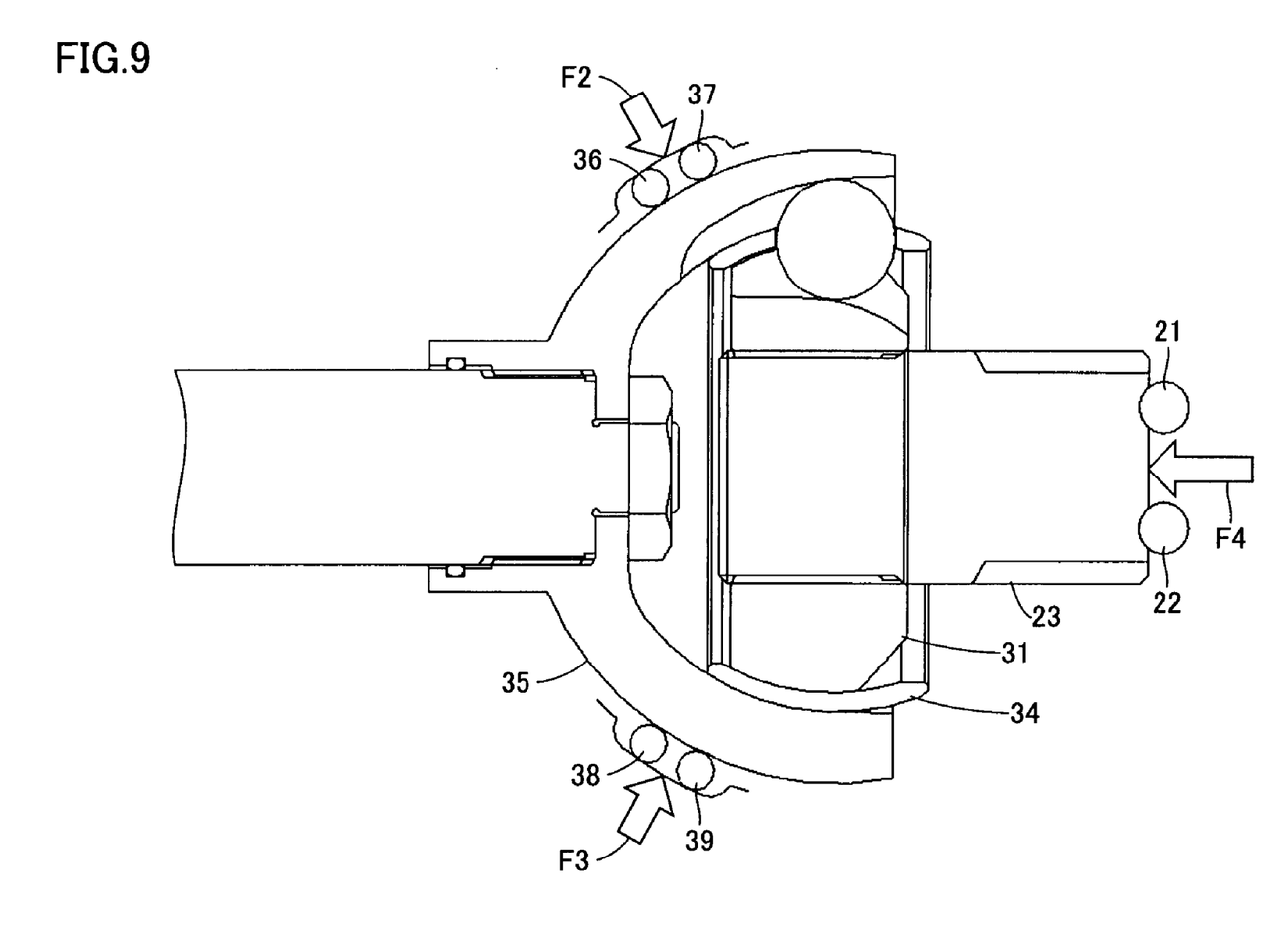
FIG. 9 illustrates how thrust bearings 21, 22 support a load in the thrust direction.

FIG. 9 illustrates how thrust bearings 21, 22 support a load in the thrust direction.

Referring to FIG. 9, to outer race 35, force F2 and force F3 are applied through balls 36–39. To sun gear 23, a force F4 is applied through thrust bearings 21, 22. Accordingly, inner race 31 and cage 34 are pressed against the internal surface of outer race 35. In other words, the load in the thrust direction that could cause sun gear 23, cage 34 and inner race 31 to come off outer race 35 is firmly supported by thrust bearings 21, 22. Thus, even if the internal surface of outer race 35 does not have the undercut shape, the sun gear, cage and inner race are prevented from coming off the outer race.

Depending on the shape of the planetary carrier, the shape of the disc rotor and the shape of the wheel disc, the thrust bearings may be placed between the end of the sun gear and the disc rotor or between the end of the sun gear and the wheel disc. Alternatively, instead of the thrust bearings, any bearings like tapered roller bearings or angular ball bearings that can support the load in the thrust direction may be employed.

Figure 10:
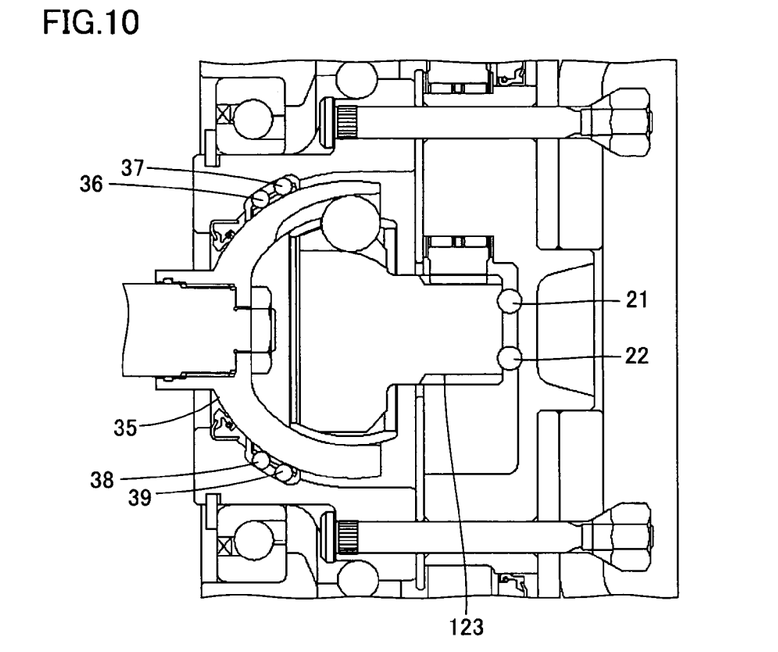
FIG. 10 illustrates a modification of a sun gear.

FIG. 10 illustrates a modification of the sun gear.

As described in connection with FIG. 8, when the internal surface of outer race 35 is undercut-free in shape, sun gear 23 and inner race 31 may be coupled and thereafter inserted into outer race 35. Accordingly, as shown in FIG. 10, a sun gear 123 into which the sun gear and the inner race are integrated may be used. Sun gear 123 can be produced for example by forging or cutting. The number of parts can thus be reduced and the assembly can further be simplified.

Regarding the constant-velocity joint, balls 36–39 of the bearing abutting the external surface of outer race 35 and thrust bearings 21, 22 at the end of sun gear 123 support outer race 35 rotatably and swingably and suppress movements in the up-and-down and side-to-side directions of sun gear 123.

Figure 11:
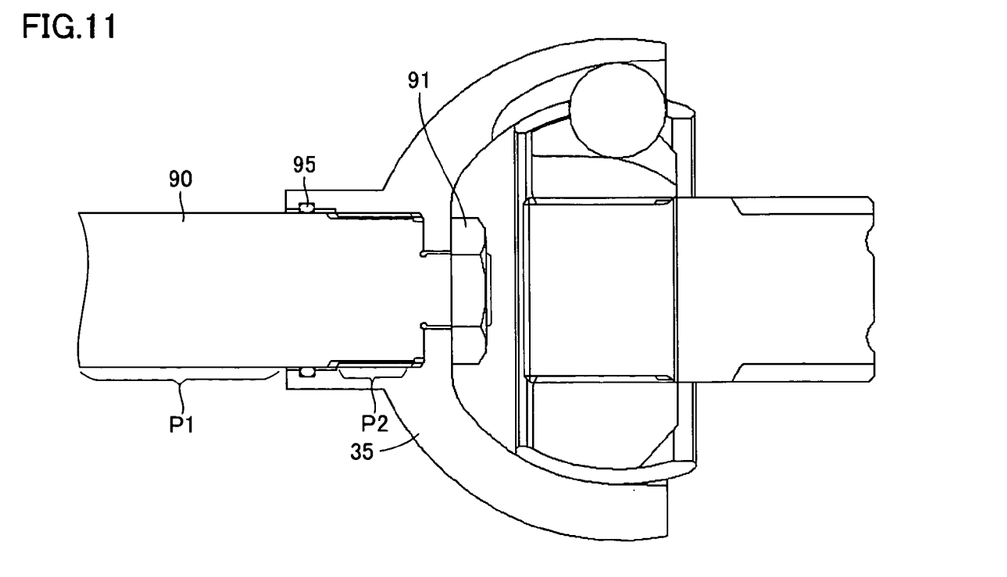
FIG. 11 illustrates a coupling portion of the outer race of the constant-velocity joint and a motor output shaft.

Description of Coupling of Outer Race of Constant-Velocity Joint and Motor Output Shaft FIG. 11 illustrates a coupling portion of the outer race of the constant-velocity joint and the motor output shaft.

Referring to FIG. 11, for the sake of simple motor assembly, usually motor output shaft 90 and outer race 35 are not integrated into a single component. Therefore, next to a non-fit portion P1 of motor output shaft 90, a fit portion P2 grooved for fitting is provided. By this fit portion P2, torque is transmitted.

Motor output shaft 90 has its leading end thinner than non-fit portion P1 and fit portion P2 and the leading end is screwed. Motor output shaft 90 is fit in and inserted into outer race 35 so that the leading end of motor output shaft 90 passes through outer race 35. From an opening of outer race 35 that is located opposite to the motor, a nut 91 is tightened on the screwed leading end so as to prevent motor output shaft 90 from coming off outer race 35. Nut 91 is tightened before inner race 31 and cage 34 of constant-velocity joint 30 are installed as described in connection with FIG. 8.

Between non-fit portion P1 and fit portion P2 of motor output shaft 90, an O ring 95 is provided. Leakage of a lubricant on the inside can thus be prevented. Further, entry of water for example can be prevented. Fit portion P2 can thus be protected against foreign matters and rust. The fit portion can be prevented from being rusted and accordingly it can be prevented that the fit portion cannot be detached. Thus, nut 91 can readily be loosened to disassemble constant-velocity joint 30 for maintenance purpose. Instead of O ring 95, such a seal member as oil seal may be used.

Figure 12:
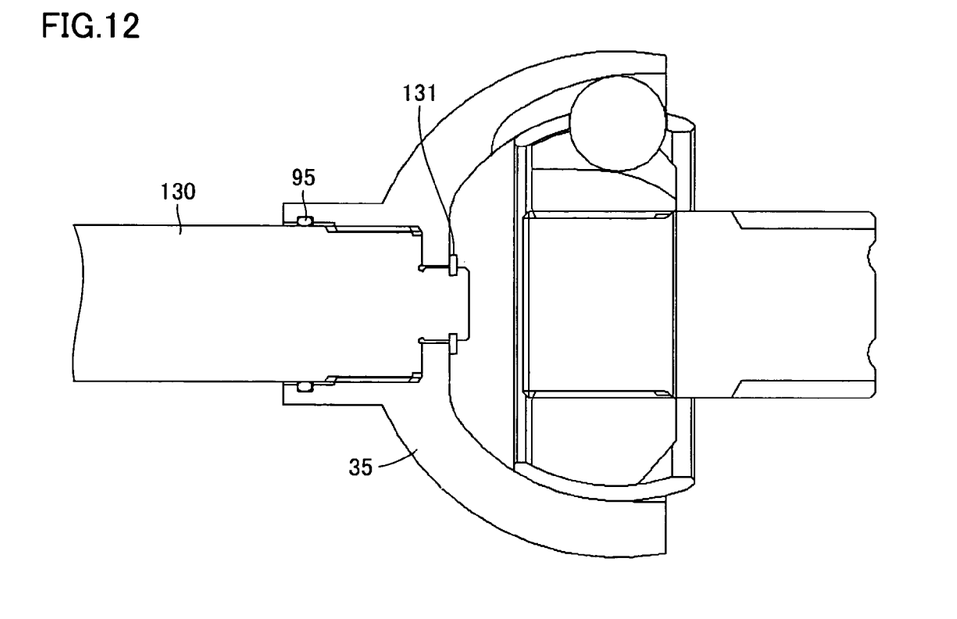
FIG. 12 illustrates a first modification of the coupling portion of the outer race of the constant-velocity joint and the motor output shaft.

FIG. 12 illustrates a first modification of the coupling portion of the outer race of the constant-velocity joint and the motor output shaft.

Regarding the modification shown in FIG. 12, instead of motor output shaft 90 shown in FIG. 11, a motor output shaft 130 different in shape of the leading end is used. The leading end of motor output shaft 130 has a groove in which a snap ling 131 is fit, instead of being screwed. From the opening of outer race 35, snap ling 131 is fit in the groove to fix the axial position of motor output shaft 130 and accordingly prevent motor output shaft 130 from coming off outer race 35. As the nut described above in connection with FIG. 8, snap ring 131 is installed before inner race 31 and cage 34 of constant-velocity joint 30 are installed.

By installing nut 91 or snap ring 131, motor output shaft 90 or 130 can be prevented from coming off outer race 35 due to axial inertial force and centrifugal force of motor parts.

Figure 13:
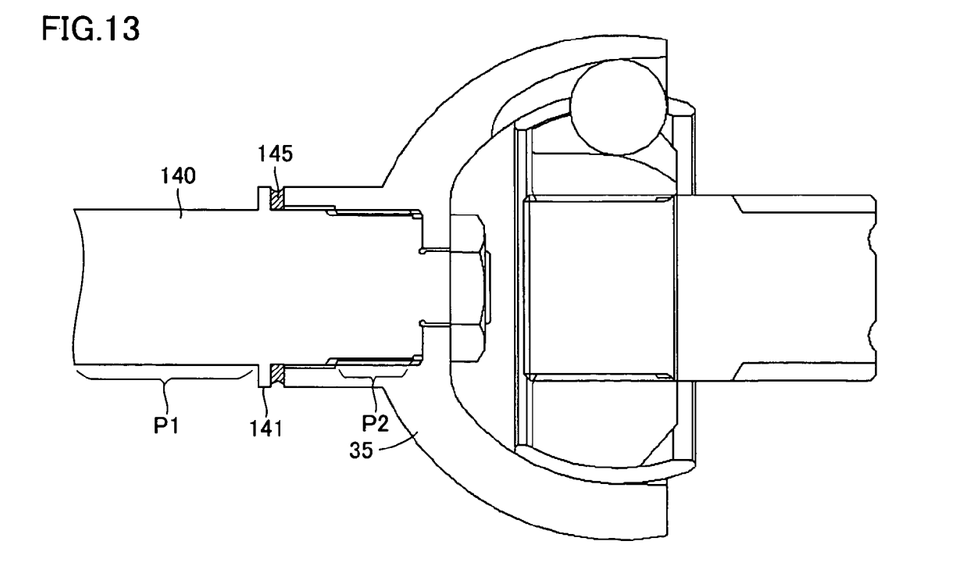
FIG. 13 illustrates a second modification of the coupling portion of the outer race of the constant-velocity joint and the motor output shaft.

FIG. 13 illustrates a second modification of the coupling portion of the outer race of the constant-velocity joint and the motor output shaft.

Regarding the modification shown in FIG. 13, instead of motor output shaft 90 shown in FIG. 11, a motor output shaft 140 having a collar 141 between non-fit portion P1 and fit portion P2 is used. To a gap between collar 141 and outer race 35, a sealing agent 145 is applied. Sealing agent 145 to be used may be any like liquid gasket for example that is cured after being applied to serve as a water-proof gasket.

As for the modification shown in FIG. 13 as well, sealing agent 145 prevents entry of water to protect fit portion P2 against foreign matters and rust. Accordingly, the fit portion can be prevented from being rusted and thus it can be prevented that the fit portion cannot be detached. Thus, nut 91 can be loosened to easily disassemble constant-velocity joint 30 for maintenance purpose.

While the embodiment of the present invention uses spring 52 as an example of the elastic member, any of such elastic members as rubber and damper having a rubber in which oil is enclosed or a combination thereof may be used instead.

According to the present invention, vibrations transmitted, depending on road conditions for example, to motor-driven wheel 1 while the vehicle is running cause the elastic member to vibrate motor IWM, which is a load member, in the up-and-down direction of the vehicle's body, with the vibrations shifted in phase. Consequently, large vibrations are not transmitted to the vehicle's body which is a sprung part (vibrations are cancelled). In this way, the ride comfort of the vehicle having the wheel unit mounted thereon and driven by in-wheel motor IWM is improved.

As heretofore discussed, according to the present invention, decelerator 20 is placed closer to the outside of the vehicle, relative to hub bearing 40, to easily secure a space where in-wheel motor IWM is to be mounted. In-wheel motor IWM is supported by constant-velocity joint 30 swingably in the axial direction. Thus, even if a considerably great axial force is exerted on in-wheel motor IWM, the motor-driven wheel can endure the axial force. Moreover, outer race 35 of constant-velocity joint 30 can be supported swingably and rotatably with respect to wheel hub 100b.

In the state where outer race 35 of constant-velocity joint 30 is supported swingably and rotatably with respect to wheel hub 100b, the lubricant for constant-velocity joint 30 and decelerator 20 can appropriately be enclosed hermetically by seal member 92. Thrust bearings 21, 22 can suppress axial movements of inner race 31 of constant-velocity joint 30 and sun gear 23 while wheel disc 10 can smoothly be rotated.

Moreover, constant-velocity joint 30 can be reduced in size and improved in ease of installation and motor output shaft 90 can be prevented from coming off outer race 35. Thus, spline-fit portion P2 of motor output shaft 90 can be protected from entry of foreign matters and rust for example.

Accordingly, the motor-driven wheel reduced in size and improved in ease of assembly and reliability while improving the ride comfort of the vehicle can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor-driven wheel comprising:
a motor supported swingably in up-and-down direction of a body of a vehicle and rotating a wheel unit;
a wheel hub rotated together with said wheel unit;
a hub bearing rotatably supporting said wheel hub;
a decelerator using a planetary gear mechanism to transmit torque of said motor to said wheel hub; and
a constant-velocity joint transmitting motive power between an output shaft of said motor and said decelerator,
said constant-velocity joint including
an outer race having an opening facing the outside of the vehicle, supported swingably and rotatably with respect to said wheel hub and connected to the output shaft of said motor,
an inner race connected to an input shaft of said decelerator, and
a first rolling body transmitting motive power between said inner race and said outer race.

2. The motor-driven wheel according to claim 1, further comprising a knuckle connected to a suspension arm attached to the body of the vehicle, wherein
said motor is connected to said knuckle through an elastic member.

3. The motor-driven wheel according to claim 2, wherein said hub bearing is fixed to said knuckle.

4. The motor-driven wheel according to claim 1, wherein
said outer race has its external surface including a spherical portion having its center at a center of swing of said constant-velocity joint,
said constant-velocity joint further includes a second rolling body placed inward of the vehicle relative to the center of swing of said constant-velocity joint, along said spherical portion of the external surface of said outer race, and
said wheel hub has a contact surface extending in a direction of swing of said outer race and contacting said second rolling body.

5. The motor-driven wheel according to claim 4, further comprising a seal member placed inward of the vehicle relative to said second rolling body and placed between said outer race and said wheel hub to hermetically enclose oil.

6. The motor-driven wheel according to claim 1, wherein said decelerator includes
a sun gear connected to said inner race,
a ring gear fixed non-rotatably,
a plurality of pinion gears arranged to mesh with both of said sun gear and said ring gear,
a planetary carrier fixed to said wheel hub and rotatably supporting said pinion gears, and
a bearing placed at an end of said sun gear and supporting a load in thrust direction.

7. The motor-driven wheel according to claim 1, wherein said constant-velocity joint is of bar field type,
said constant-velocity joint further includes a cage restraining position of said first rolling body, and
said outer race has an internal surface that contacts said cage and that is undercut-free in shape.

8. The motor-driven wheel according to claim 1, wherein said output shaft of said motor is fit in said outer race,
said output shaft of said motor has a leading end passing through said outer race, and
said motor-driven wheel further comprises a fixing member attached from said opening of said outer race to said leading end for fixing said output shaft to prevent said output shaft from coming off said outer race.

9. The motor-driven wheel according to claim 1, wherein said output shaft of said motor includes
a fit portion having its surface grooved for spline-fitted with said outer race, and
a non-fit portion provided closer to said motor relative to said fit portion, and
said motor-driven wheel further comprises a seal member placed between said non-fit portion and said outer race.

10. The motor-driven wheel according to claim 1, wherein the decelerator is located between the wheel unit and the constant-velocity joint.

* * * * *

UNITED STATES PATENT AND TRADEMARK OFFICE
CERTIFICATE OF CORRECTION

PATENT NO. : 7,216,731 B2 Page 1 of 1
APPLICATION NO. : 11/126228
DATED : May 15, 2007
INVENTOR(S) : Takuma Kakinami, Takeo Yamamoto and Shigekazu Yogo It is certified that error appears in the above-identified patent and that said Letters Patent is hereby corrected as shown below:

On the title page, in item (73) Assignee, "Tokyo, (JP)" should be --Toyota, (JP)--.

Signed and Sealed this

Seventh Day of August, 2007

JON W. DUDAS
*Director of the United States Patent and Trademark Office*